United States Patent
Lane et al.

(10) Patent No.: US 6,746,387 B2
(45) Date of Patent: Jun. 8, 2004

(54) AGRICULTURAL ROLLER

(75) Inventors: John L. Lane, Lafayette, CO (US); Wayne R. Willkomm, Erie, CO (US); Thomas Peterson, Broomfield, CO (US); Michael Adamson, Broomfield, CO (US); Stephen Ulm, Arvada, CO (US)

(73) Assignee: Kryptane Systems, Inc., Louisville, CO (US)

( * ) Notice: Subject to any disclaimer, the term of this patent is extended or adjusted under 35 U.S.C. 154(b) by 0 days.

(21) Appl. No.: 10/192,019

(22) Filed: Jul. 10, 2002

(65) Prior Publication Data

US 2003/0013587 A1 Jan. 16, 2003

Related U.S. Application Data

(60) Provisional application No. 60/304,532, filed on Jul. 10, 2001.

(51) Int. Cl.[7] .................................................. B25F 5/02
(52) U.S. Cl. .......................................... 492/47; 492/45
(58) Field of Search .............................. 492/47, 45, 39, 492/40; 464/184; 193/37; 29/895.22

(56) References Cited

U.S. PATENT DOCUMENTS

| | | | | |
|---|---|---|---|---|
| 3,406,438 A | * | 10/1968 | Reilly | 492/16 |
| 4,174,031 A | * | 11/1979 | MacLeod | 198/501 |
| 4,339,158 A | * | 7/1982 | Greener et al. | 193/37 |
| 5,022,132 A | * | 6/1991 | Valster et al. | 193/37 |
| 5,046,869 A | * | 9/1991 | Roberts et al. | 384/537 |
| 5,261,528 A | * | 11/1993 | Bouchal | 193/37 |
| 5,329,849 A | * | 7/1994 | Roerig | 492/7 |
| 5,346,438 A | * | 9/1994 | Gerstenberger et al. | 474/151 |
| 5,454,460 A | | 10/1995 | Lane | |
| 5,653,633 A | | 8/1997 | Kalverkamp et al. | |
| 5,722,888 A | | 3/1998 | Lane | |
| 5,944,161 A | * | 8/1999 | Sealey | 193/37 |
| 5,951,450 A | * | 9/1999 | Chen | 492/47 |
| 6,032,778 A | * | 3/2000 | O'Donnell | 193/37 |
| 6,287,014 B1 | * | 9/2001 | Salla | 193/37 |
| 6,516,942 B2 | * | 2/2003 | East | 193/35 R |

* cited by examiner

Primary Examiner—I Cuda-Rosenbaum
Assistant Examiner—Marc Jimenez
(74) Attorney, Agent, or Firm—The Maxham Firm

(57) ABSTRACT

A roller assembly for use, for example, in agricultural machines where the roller assembly has an exterior surface portion adapted to contact a conveyor element supporting the agricultural products and a bearing sub-assembly positioned about an axle in the center of the roller assembly. The bearing sub-assembly has at least one bearing, at least one sealing element having an elastomeric sealing portion positioned outboard of the bearing and at least one standoff also positioned outboard of the bearing. The standoffs have grooves in their outer dimension adapted to receive the elastomeric sealing portion. The diameter of the standoffs are about the same as the diameter of the elastomeric sealing portion. The horizontal length of the standoffs may also be chosen so as to offset the exterior surface portion of the assembly a predetermined distance with respect to the conveyor element.

3 Claims, 3 Drawing Sheets

AGRICULTURAL ROLLER

REFERENCE TO RELATED APPLICATION

The present invention claims priority to U.S. provisional application No. 60/304,532, filed Jul. 10, 2001.

BACKROUND OF INVENTION

1. Field of Invention

This invention is directed generally toward rollers used on machines and more specifically toward rollers used on machinery in the harvesting of agricultural products.

2. Discussion of Related Art

Conveyors are commonly used during the harvesting and processing of agricultural products. Harvesters used in the harvest of such crops as potatoes, sugar beets, onions and carrots employ such conveyors. These conveyors are designed to shed dirt as they convey produce from the ground to the truck, for example. In processing applications, these conveyors also shed dirt, sand and other unwanted objects as they convey the produce. Examples of rollers employed with such conveyors are shown in U.S. Pat. Nos. 5,454,460 and 5,722,888. Due to the location required to support these conveyors, the dirt, sand and other materials shed from these conveyors tends to fall directly onto these rollers. Most often the rollers eventually fail due to contaminants getting to the bearings within the rollers. In fact, those rollers rarely fail for any other cause.

Prior art rollers are bored axially for the placement of radial ball bearings to support the load of the roller. Additionally, there may be other devices placed outboard of the bearing to offer greater sealing against contaminants. Typically, there will be a bushing placed through the bearing's bore to size for an axle which is usually a bolt that attaches the roller to the frame of the harvester. These bushings typically extend beyond the length of the roller so as to stand the roller off from the frame of the harvester a defined distance. Axial bores in the prior art are parallel to the axle. Consequently, outer dimensions of bushings, also known as "standoffs," are then parallel to the axle. The dimensions of the standoffs or bushings are horizontal, allowing for an easy migration of contaminants along the topside of the standoff into the bearing housing.

Another problem existing with conventional rollers is with dirt or mud packing up on the standoff and eventually forcing its way beyond any additional sealing device and into the bearing bore. Eventually the contaminant gets into the bearings, causing the roller to fail.

SUMMARY OF THE INVENTION

Broadly speaking, this invention involves both aspects of the sealing of the roller, as well as directing contaminates away from areas where they would enter vulnerable parts of the roller, thereby causing the bearings to fail.

In a preferred embodiment of the invention, the roller assembly has an exterior portion adapted to support a conveyor element, and a bearing sub-assembly positioned within the exterior portion about a central axis. The bearing sub-assembly also has at least one bearing, at least one sealing element positioned outboard of the bearing and at least one standoff also positioned outboard of the bearing. The standoff also has a groove positioned on an outer surface thereof so that the groove can receive the sealing element therein.

In additional embodiments, the standoff may also have an inclined surface on an inboard side thereof. The inclined surface may be adapted for installing the lip, or elastomeric sealing portion of the sealing element gradually thereon without causing damage to it. Also the exterior portion of the assembly preferably has no surface that is parallel to the axis of the assembly. This allows for foreign material to be more readily shed off the surface of the roller assembly. Also preferably the diameter of the standoff is about the same as the diameter of the lip of the elastomeric sealing portion. In another embodiment, the horizontal length of the standoffs may be chosen so as to offset the exterior portion of the roller assembly at a predetermined distance with respect to the conveyor element.

In a preferred embodiment, the lip of the sealing element, which is also referred to herein as an elastomeric sealing portion, is reversed from the orientation used in prior devices. There is also a controlled distance between the elastomeric sealing potion and the vertical dimension of the standoff, thereby allowing a minimum amount of contamination to be trapped in this space. With the reversed lip on the oil seal, any particles finding their way into this cavity will serve to tighten the sealing lip against the standoff, producing an even tighter seal. However, the invention also comprises embodiments wherein the elastomeric sealing portion is in the orientation used in prior devices, although it is anticipated that in these embodiments, the sealing will not be as efficient.

In another preferred embodiment, the outboard surface of the standoff is sloped downward topside so as to convey dirt away from the bearings. The bore about the central axis of the roller also has a taper, which is wider at the outboard positions, thereby allowing gravity to assist with the elimination of any contamination that does get in the bore. Also preferably, the bore is configured so as to accommodate a snap ring without compression.

BRIEF DESCRIPTION OF THE DRAWING

The objects, features and advantages of the invention will be more clearly perceived from the following detailed description, when read in conjunction with the accompanying drawing, wherein.

DETAILED DESCRIPTION OF THE PREFERRED EMBODIMENTS

The objects and advantages of the invention include providing relatively efficient removal of dirt and other foreign material from the agricultural product while at the same time minimizing bruising, scraping, peeling and other types of damage to the agricultural product. The invention is particularly adapted for harvesting and removing dirt from potatoes and carrots, as well as other vegetables. The invention can also be used to clear rocks from a field. In addition, the invention is constructed so as to reduce failure of the roller due to contamination. The invention is also particularly adapted for use in any application where contaminants would harm or destroy the bearings in a roller. For example, although the discussion herein primarily relates to agricultural machines, the invention is equally applicable to other applications, such as on escalators, elevators, factory assembly lines, or any application where rollers are used. Those skilled in the art understand that the present invention is adapted for use in any application where contaminants would otherwise damage or destroy the operation of the roller, particularly through penetration of the bearings.

The roller assemblies are preferably used in sets in conjunction with endless conveyors that pass over the roller assemblies. The rollers thereby support the conveyors upon which harvested material passes over.

Figure 1:
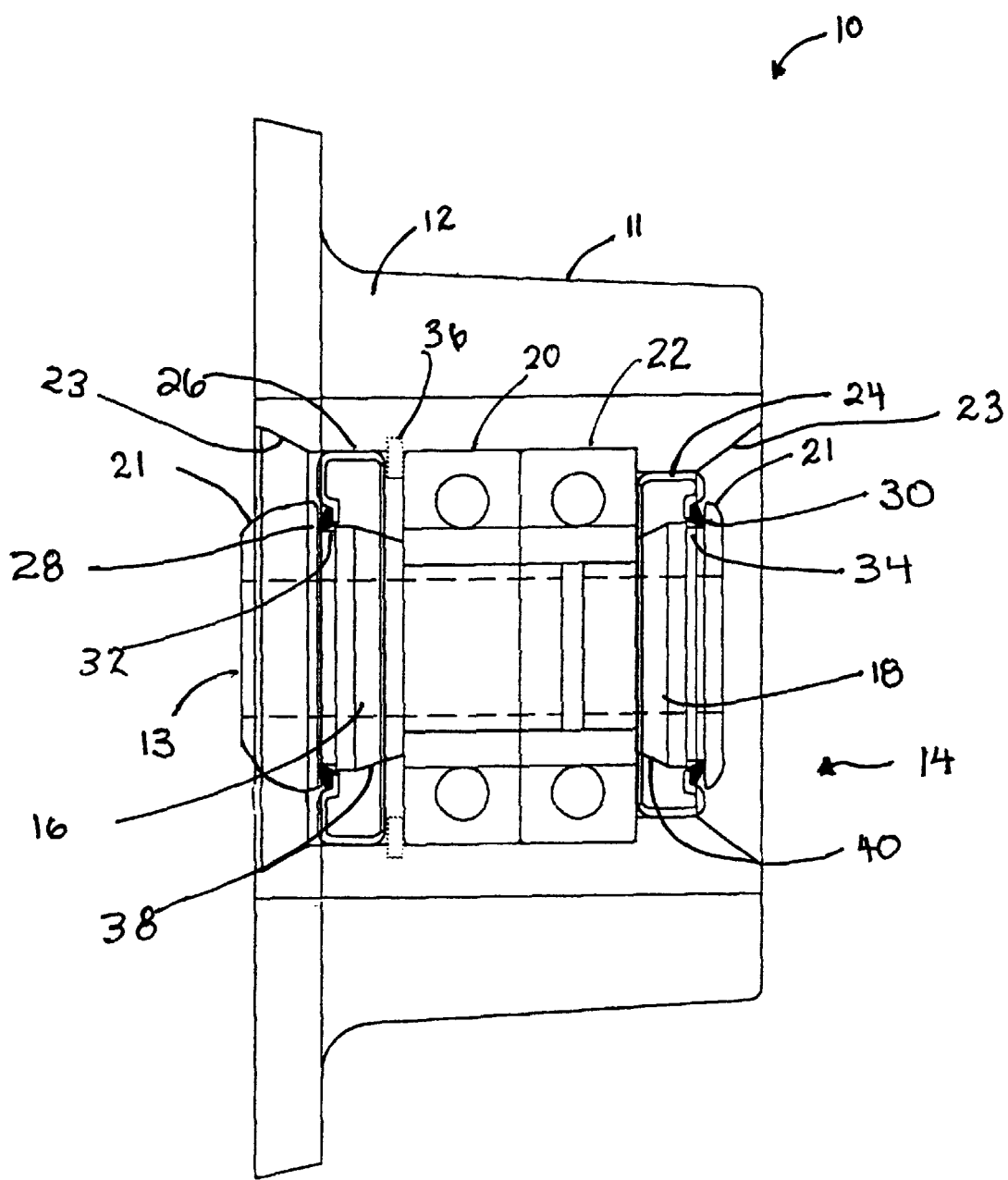
FIG. 1 is a cross-sectional view of a roller assembly constructed in accordance with the present invention.

Referring to FIG. 1 of the drawing, roller assembly 10 is shown in a cross-section view. The roller assembly has long-wearing, resilient exterior portion 12, which is either bonded to bearing sub-assembly 14, or is an extension of the material making up the sub-assembly. Exterior portion 12 also preferably has angled outer surfaces, as shown by non-parallel surface 11. Surface 11 is non-parallel to axle 13 of the assembly, such that mud and other unwanted materials are shed, resisted or repelled off of the rolling face of the tire. As will be appreciated by those skilled in the art, a conveyor belt passes over surface 11. As surface 11 is not parallel with either the axle or the plane of the conveyor belt, contaminants can roll off of the edge of the tire. This allows for more contact between the roller and conveyor belt, thereby allowing contaminants to be removed more quickly and efficiently.

Bearing sub-assembly 14 is preferably made of a relatively strong material such as steel. However the sub-assembly can be made of any material strong enough to withstand contact of the tire with the conveyor belt. Many blends of high-density thermoplastics, including products such as glass filled nylons will be adequate. In addition, exterior portion 12 may be made of any material with strength and abrasion resistance sufficient to tolerate operating conditions where it is possibly operating partially or completely submerged in sand or water. For example the exterior portion could be made of heat-treated steel for maximum durability and dirt-removal effect. However, in a preferred embodiment, the exterior portion is constructed of resilient plastic material and the bearing sub-assembly is constructed of steel.

Figure 2:
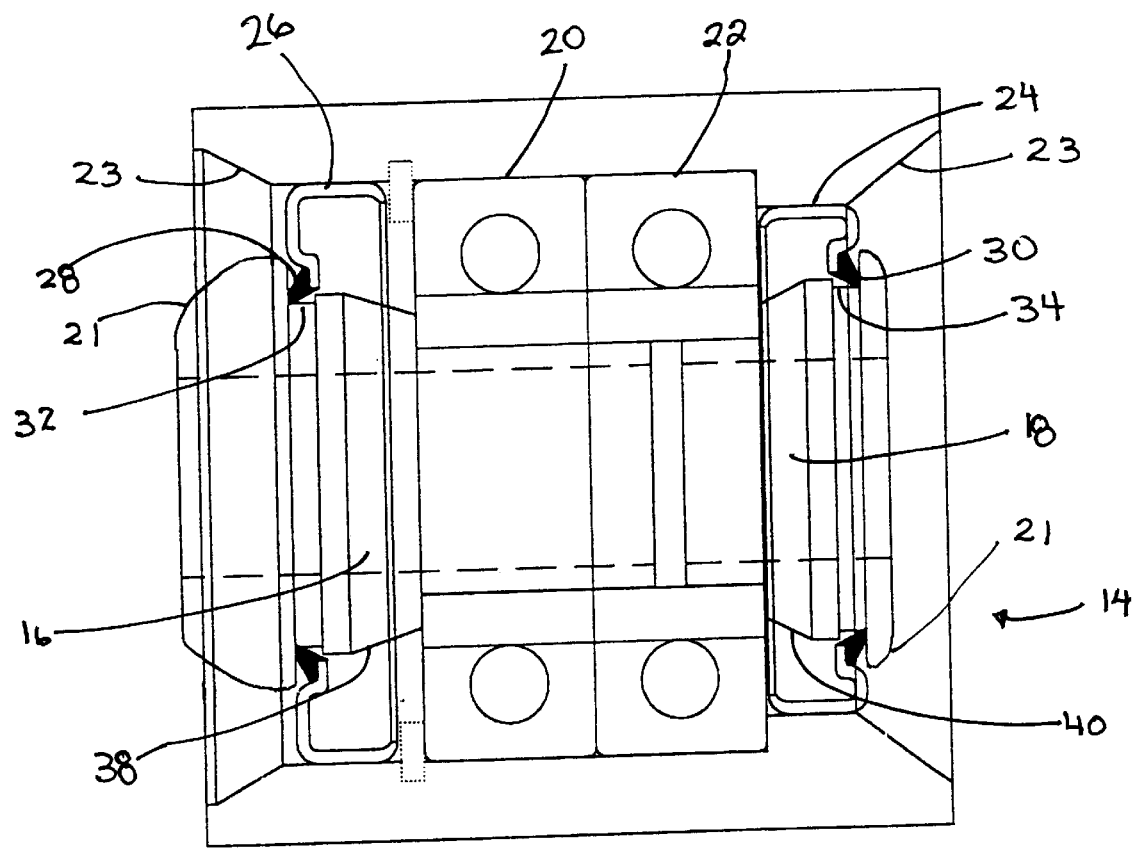
FIG. 2 shows a vertical cross-section of the bearing sub-assembly of an assembly according to the present invention.
Figure 3:
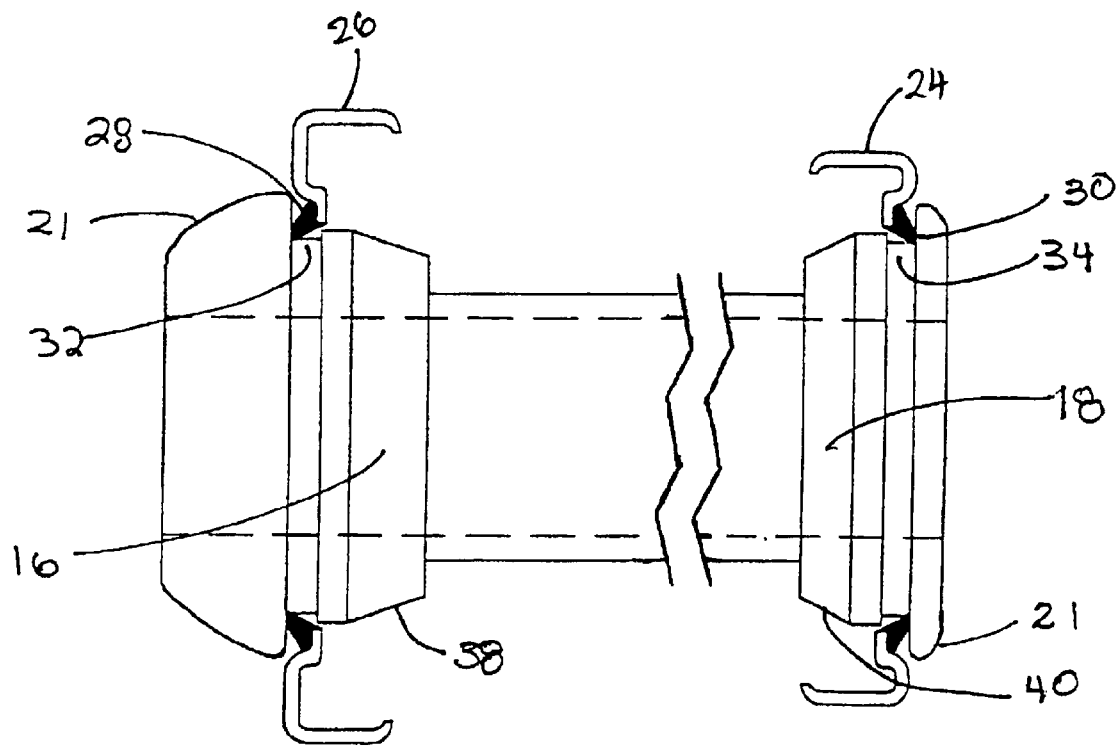
FIG. 3 shows the standoff assembly and orientation of the sealing element in one embodiment of the present invention.

The bearing sub-assembly also contains at least one standoff and at least one bearing. Preferably there will be two standoffs and two bearings. It can also be appreciated that the standoffs are also machined to locate within the inner bore of the bearings and to register each critical dimension from the outer dimension of the bearing inner race. As shown in FIGS. 1, 2 and 3, standoffs 16 and 18 are placed outboard axially of bearings 20 and 22, respectively. Snap ring 36 retains bearings 20 and 22 in place. The standoffs may be machined to a predetermined length so as to set the roller assembly at a predetermined distance off of the conveyor apparatus. FIG. 3 shows standoffs 16 and 18, and that their lengths may be variable. Those skilled in the art would be readily able to determine the length of standoff necessary for their particular application.

The bearing sub-assembly also contains at least one mechanical seal. Preferably there will be two mechanical seals. As shown in FIGS. 1, 2 and 3, mechanical seals or sealing elements 24 and 26 are provided. These sealing elements contain elastomeric sealing potions 30 and 28 respectively. In a preferred embodiment, the elastomeric sealing potions are placed to face outboard at about 45 degrees with respect to the axis of the assembly. However, in other embodiments, the elastomeric sealing portions are placed inward at about 45 degrees with respect to the axis of the assembly, or either at about 90 degrees with respect to the axis of the assembly. The standoffs are provided with grooves 32 and 34, in which the elastomeric sealing potions rest. The inboard wall of the grooves provides a backstop for the elastomeric sealing potions to rest against, especially when foreign matter is pressing from the outside. If desired, more than one mechanical seal per standoff may be used. Those skilled in the art will appreciate that the greater the number of mechanical seals, the longer the life of the roller will be. They will also appreciate that physical size and manufacturing expense are limiting factors in this regard.

Referring now to FIG. 2, outboard dimension of standoffs 16 and 18, which is directly beyond grooves 34 and 32, is the same diameter as elastomeric sealing potions 28 and 30 of the sealing elements. This feature provides protection to the relatively fragile elastomeric sealing potions. It is also contemplated herein that the outboard dimension of the standoffs may be greater than the diameter of the elastomeric sealing potions. However, it is generally understood that the dimension cannot be less, otherwise the elastomeric sealing potion would have no structure to retain it in place. However, in preferred embodiments the outboard dimension of the standoffs are approximately equal to the diameter of the elastomeric sealing potions. It has been found that that when foreign material is allowed to contact the elastomeric sealing potion, the foreign material presses the seal against the groove, thereby improving the sealing effect.

In FIGS. 1, 2 and particularly 3, it can be seen that the outboard dimensions of the standoffs have tapered downward surface 21. This tapered downward surface provides greater removal of foreign material. In addition, particularly as shown in FIGS. 1 and 2, the central axis of the exterior portion comprises tapered opening 23, such that said opening is tapered wider as the opening moves from the interior to the exterior surfaces of the roller assembly. This also serves to help eliminate dirt and foreign material from the assembly.

Referring now to FIG. 3 it can be seen that standoffs 16 and 18 have inclined surfaces 38 and 40, respectively. Each inclined surface allows the elastomeric sealing potion to be eased up during installation before it drops into the groove.

While the present invention has been illustrated and described by means of specific embodiments and alternatives, it is to be understood that numerous changes and modifications can be made herein without departing from the spirit and scope of the invention. Therefore, it should be understood, the invention is not to be limited in any way except in accordance with the spirit of the appended claims and their equivalents.

What is claimed is:

1. A roller assembly for use in agricultural machinery, said assembly comprising, an exterior portion adapted to support a conveyor element, wherein the exterior portion has outer surfaces such that no surface thereof is parallel to the central axis of the assembly; and a bearing sub-assembly positioned within the exterior portion about a central axis, said sub-assembly comprising;

two bearings;

two sealing elements, each having elastomeric sealing portions positioned outboard of the bearings; and two standoffs, each positioned outboard of the bearings, wherein the standoffs each have an inclined surface on inboard sides thereof, said inclined surfaces adapted for installing the elastomeric sealing portions gradually without damage thereto, wherein the diameter of the standoffs are about the same as the diameter of the elastomeric sealing portions and wherein the standoffs further comprise a groove positioned on an outer surface thereof, said grooves being adapted to receive the elastomeric sealing portions therein.

2. The roller assembly of claim 1, wherein the horizontal length of the standoffs are chosen so as to offset the exterior portion of the roller assembly a predetermined distance with respect to the conveyor element.

3. The roller assembly of claim 1, wherein the elastomeric sealing portions are oriented to face outboard at about 45 degrees with respect to the axis of the assembly.

* * * * *